United States Patent [19]
Hatta

[11] Patent Number: 5,115,508
[45] Date of Patent: May 19, 1992

[54] PASSWORD SYSTEM UTILIZING TWO PASSWORD TYPES, THE FIRST BEING CHANGEABLE AFTER ENTRY, THE SECOND BEING UNCHANGEABLE UNTIL POWER IS REMOVED

[75] Inventor: Koichi Hatta, Yamatokoriyama, Japan

[73] Assignee: Sharp Kabushiki Kaisha, Osaka, Japan

[21] Appl. No.: 175,614

[22] Filed: Mar. 29, 1988

Related U.S. Application Data

[63] Continuation of Ser. No. 735,198, May 17, 1985, abandoned.

[30] Foreign Application Priority Data

May 22, 1984 [JP] Japan ................ 59-104209

[51] Int. Cl.$^5$ .............................................. G06F 11/00
[52] U.S. Cl. .................... 395/725; 364/DIG. 1; 364/286.5; 364/234.4; 364/231.2; 380/4; 380/25; 340/825.34
[58] Field of Search ... 364/200 MS File, 900 MS File; 380/4, 23, 24, 25; 340/825.3, 825.34; 235/380, 382, 382.5

[56] References Cited

U.S. PATENT DOCUMENTS

| | | | |
|---|---|---|---|
| Re. 29,259 | 6/1977 | Sabsay | 340/149 A |
| Re. 32,468 | 8/1987 | Le Nay et al. | 340/505 |
| 3,806,882 | 4/1974 | Clarke | 364/200 |
| 3,890,601 | 6/1975 | Pietrolewicz | 364/200 |
| 3,976,840 | 8/1976 | Cleveland et al. | 179/2 |
| 4,211,919 | 7/1980 | Ugon | 235/487 |
| 4,213,118 | 7/1980 | Genest et al. | 340/149 |
| 4,215,421 | 7/1980 | Giraud | 364/900 |
| 4,314,352 | 2/1982 | Fought | 364/900 |
| 4,371,482 | 6/1981 | Giraud | 364/900 |
| 4,458,315 | 7/1984 | Uchenick | 364/200 |
| 4,484,306 | 11/1984 | Kulczyckyj et al. | 364/900 |
| 4,494,114 | 1/1985 | Kaish | 340/825.31 |
| 4,555,591 | 11/1985 | Nash | 178/22.13 |
| 4,596,898 | 7/1986 | Pemmaraju | 380/45 |
| 4,601,011 | 7/1986 | Crynberg | 364/900 |
| 4,652,990 | 3/1987 | Pailen et al. | 364/200 |

Primary Examiner—Thomas C. Lee
Assistant Examiner—Richard Lee Ellis

[57] ABSTRACT

An information protective device protects stored information such as a program, data or the like in an information processing apparatus such as small type of portable computer or the like. The information protective device comprises a prohibition condition storing portion, which stores the writing prohibition condition to a storage unit for programs, data or the like, and a prohibition condition setting means, which carries out the writing of prohibition instructions to be stored in the storing portion to set the writing prohibition condition, so that the storage unit may be handled like so-called read only memory (ROM), whereby the storing contents may be protected more positively.

7 Claims, 4 Drawing Sheets

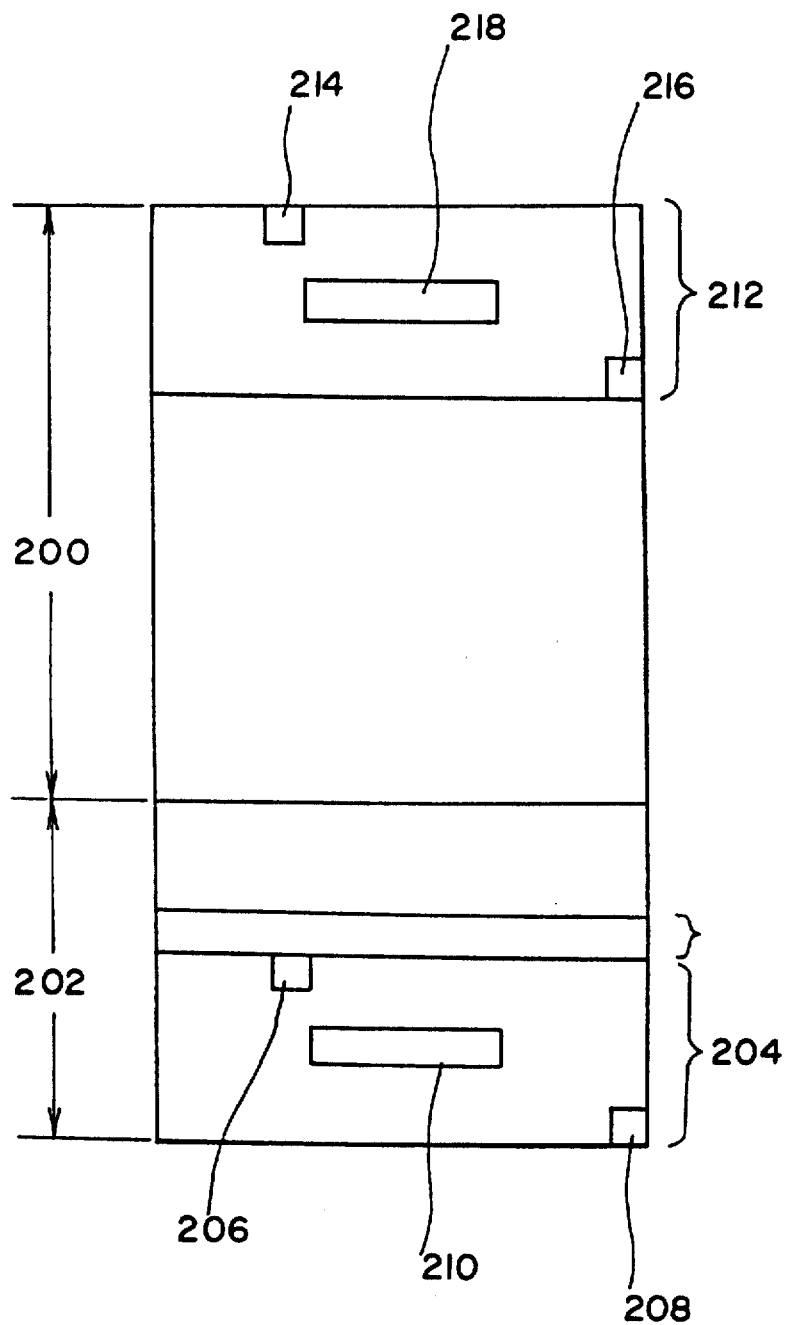

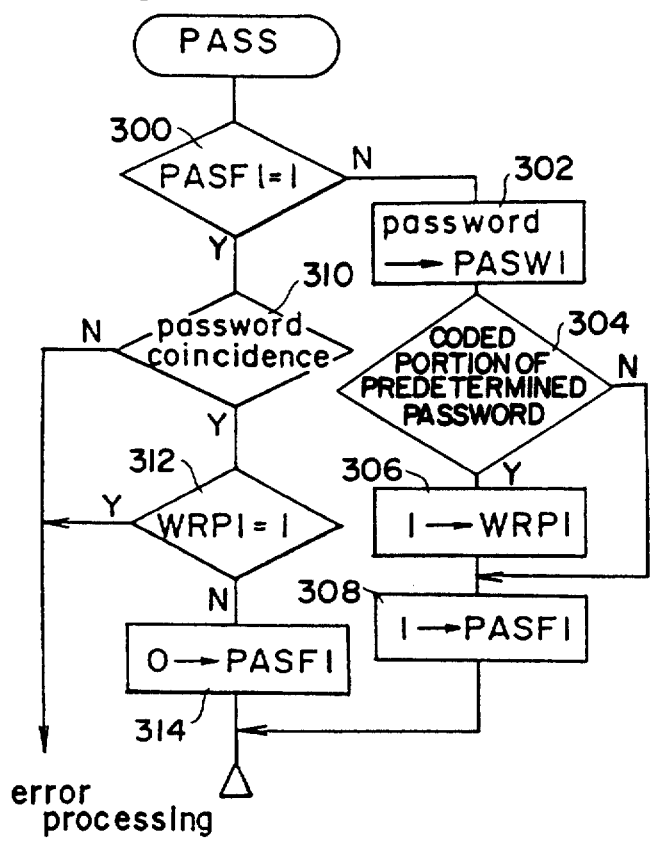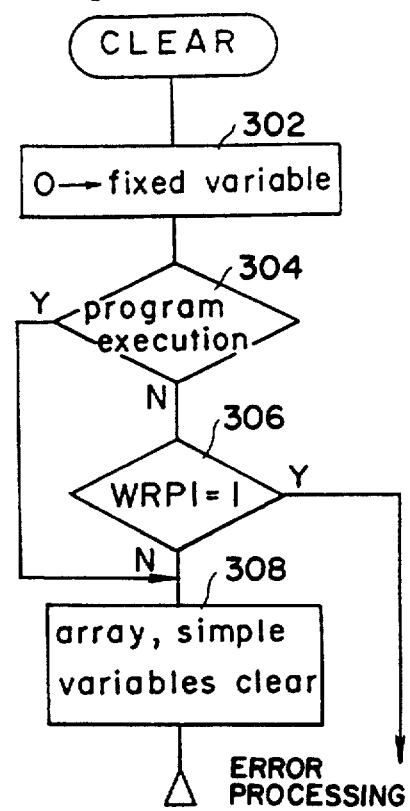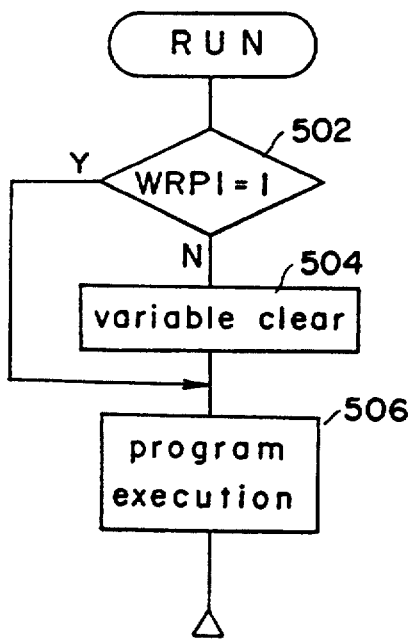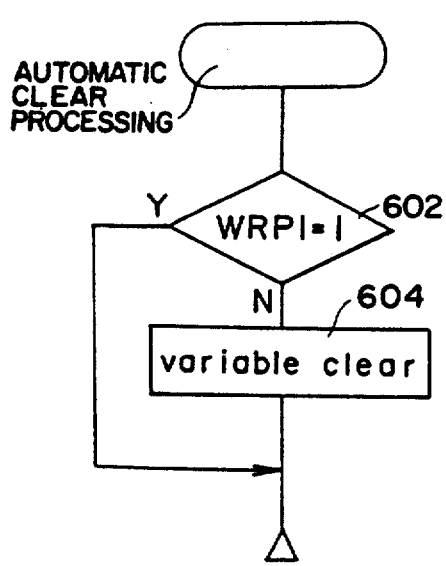

PASSWORD SYSTEM UTILIZING TWO PASSWORD TYPES, THE FIRST BEING CHANGEABLE AFTER ENTRY, THE SECOND BEING UNCHANGEABLE UNTIL POWER IS REMOVED

This application is a continuation of application Ser. No. 735,198, filed on May 17, 1985, now abandoned.

BACKGROUND OF THE INVENTION

1. Field of the Invention

The present invention relates to a device, which protects stored information such as programs, data or the like in an information processing apparatus such as a portable computer or the like.

2. Description of the Prior Art

Generally, in the above-described information processing apparatus, the program and the data stored in the apparatus are protected and designed not to be easily broken. However, conventional stored information protections can be broken by error operations because of insufficient protective measures.

SUMMARY OF THE INVENTION

Accordingly, the present invention has been developed with a view to substantially eliminate the above drawback inherent in prior art information protective devices and has for its essential object to provide an improved information protective device over the prior art protective devices.

Another important object of the present invention is to provide an improved information protective device of the type referred to above, which causes writing prohibition instructions to a storing device to be stored and later executed so as to set the condition for writing the prohibition condition.

A further object of the present invention is to provide an improved information protective device, which is capable of more effectively protecting the stored information.

According to the present invention, there is provided an information protective device having a prohibition condition storing portion for storing a writing prohibition condition into a storage unit for a program, data or the like, a prohibition condition setting means for writing prohibition instructions to the storing portion to set the writing prohibition condition, said writing prohibition instructions being adapted to be carried out together with the registration setting of passwords, and after the writing prohibition instructions have been carried out, the registered passwords being set.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings, in which:

FIG. 3 is a diagram showing the region of a memory employed in the computer of FIG. 1;

FIG. 4 is a processing flow chart of pass instructions employed in the computer of FIG. 1;

FIG. 5 is a processing flow chart of data erasing instructions employed in the computer of FIG. 1;

FIG. 6 is a processing flow chart of data erasing instructions employed in the computer of FIG. 1; and FIG. 7 is a flow chart of automatic clear instructions employed in the computer of FIG. 1.

DETAILED DESCRIPTION OF THE INVENTION

Figure 1:
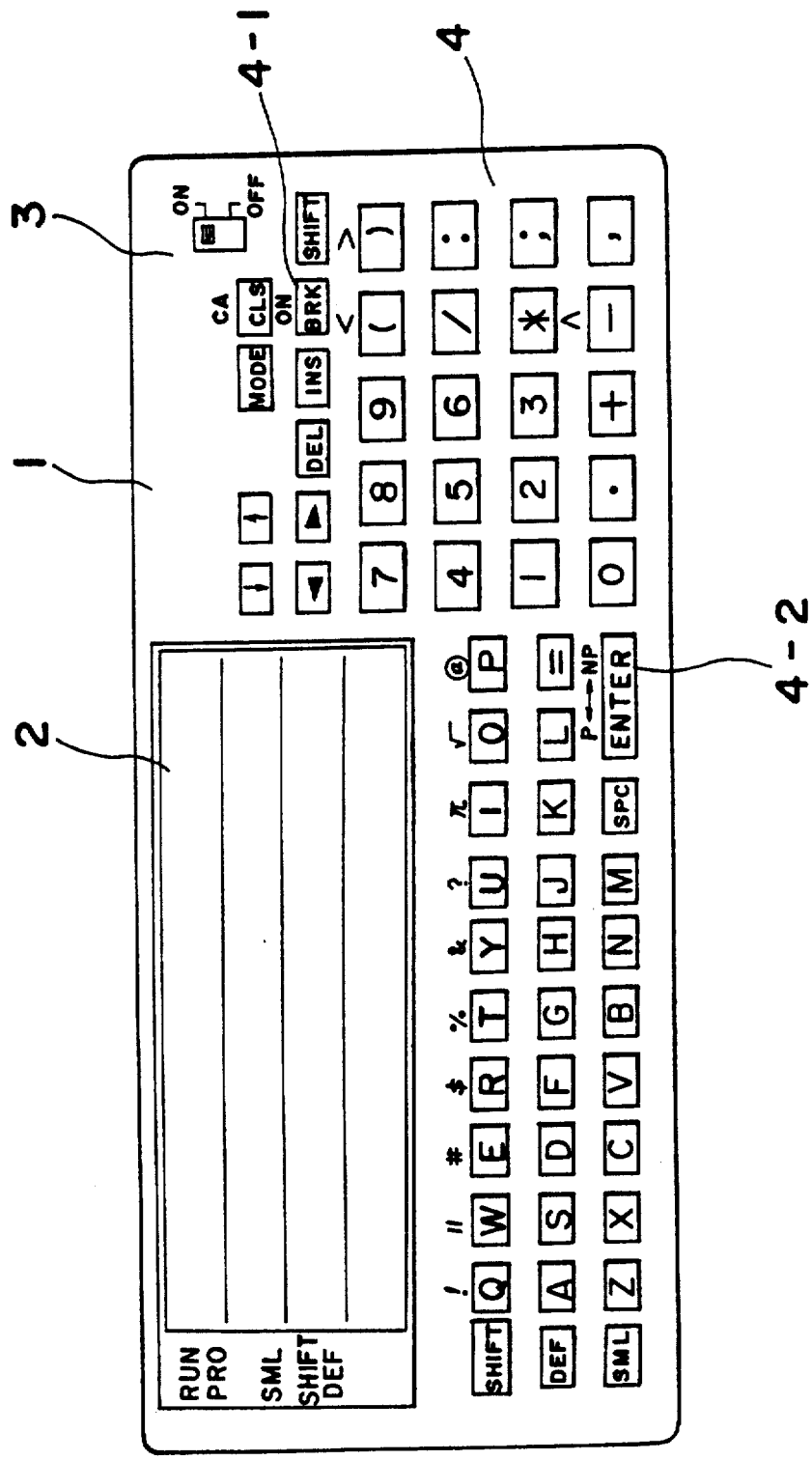
FIG. 1 is a plan view of a small-sized computer utilizing a device of the present invention.

In the description of the present invention, like parts are designated by like reference numerals throughout the several views of the accompanying drawings.

Referring now to the drawings, there is shown in FIG. 1 a plan view of a small-sized computer for portable use incorporating an information protective device according to the present invention. In FIG. 1, there are shown a computer main body 1, a liquid crystal display portion 2, a power-supply on/off switch 3, and a key input unit 4.

Figure 2:
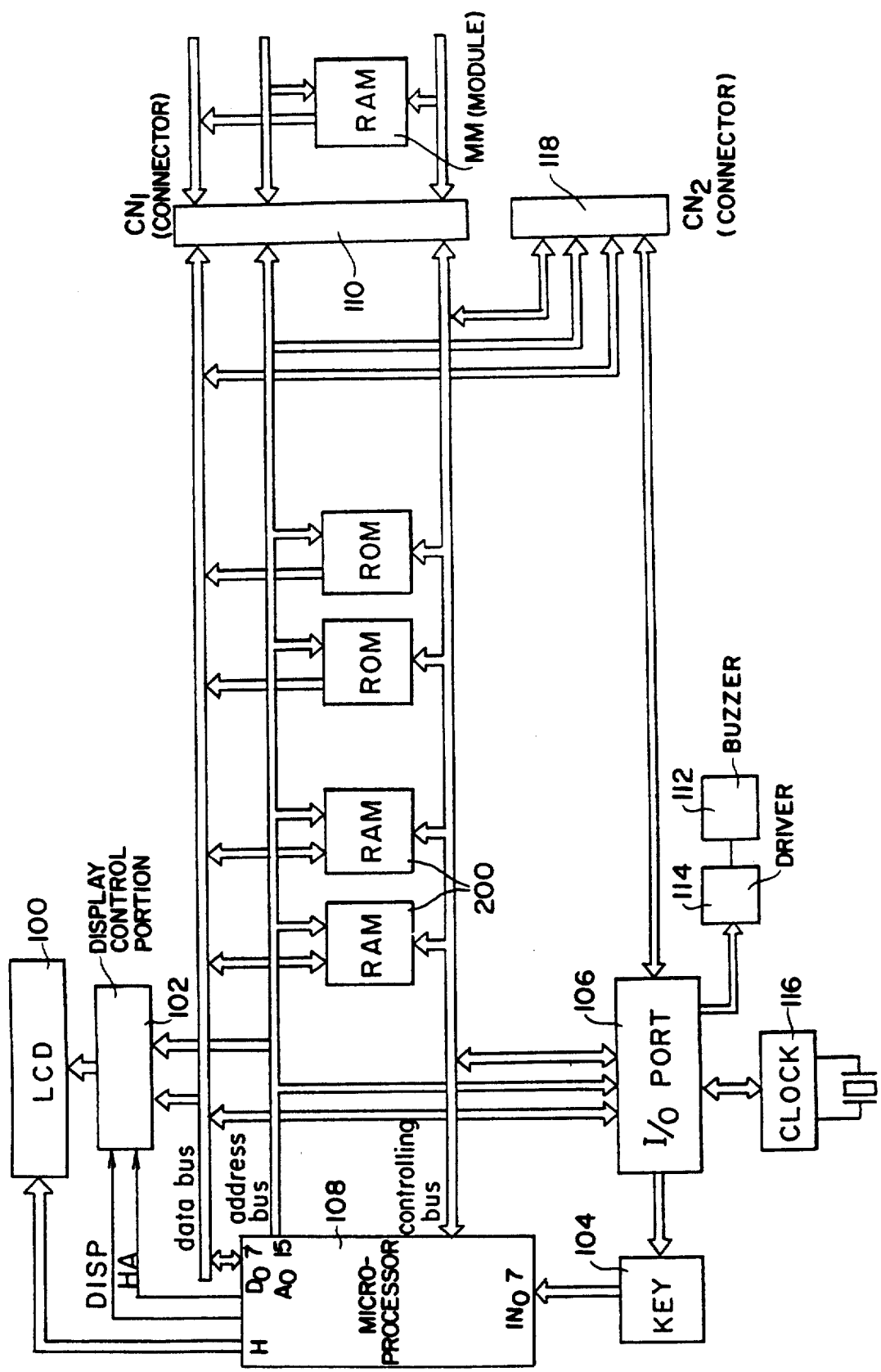
FIG. 2 is an electric block diagram showing the system construction of the computer of FIG. 1.

The system construction of the computer is shown in FIG. 2. In FIG. 2, LCD is a display portion composed of a liquid crystal display element 100 in which the literal display and symbol segment lighting are controlled by a display control portion 102.

KEY 104 is a key input unit for receiving key stroke signals input from I/O PORT 106 and for later sending the key return signals output to the MPU, a microprocessor 108. RAM is a read/write memory, in which various registers, flags, programs or the like are stored. ROM is a read only memory, in which an interpriter for carrying out the program or other controlling programs are stored in advance. CN1 represents a connector 110 for connecting the memory of the RAM or ROM as a module. These memories are collectively connected through an address bus, a data bus and a controlling bus, in which MM represents a module.

The I/O PORT 106 is an input/output port. This port 106 is connected to the other elements of the system via an address bus, a data bus and a controlling bus to work as an interface with respect to the microprocessor, MPU 108. A buzzer sound body 112 is driven by a driver 114. CLOCK 116 is a clock circuit. The I/O PORT 106 inputs and outputs signals to these input/output units. Namely, it outputs stroke signals to the KEY 104, inputs/outputs time data to the CLOCK 116, and outputs driving signals to a driver 114.

CN2 118 is a connector for connecting the system to an external input/output unit such as a data recorder, printer or an expansion memory. The microprocessor unit MPU 108 outputs synchronous signals HA, display ON/OFF signals DISP to the display control portion 102, and also outputs backplate signals H to the LCD 100. The display control portion 102 has display memories therein which correspond respectively to the segments of the display portion LCD, and the respective bits corresponding to the display patterns are written to display desired letters and symbols.

FIG. 3 is a view showing the memory regions. Referring to FIG. 3, MM 200 is the RAM region of the memory module. SY 202 shows the RAM region within the main body, a portion of SY 202 being used as a system area SA 204, and as storing regions for other user programs and data. Given locations within the system area SA 204 are used to store writing prohibition flag WRP 206, password setting flag PASF1 208 and password register PASW1 210. MM 200 also is used as an executive table KT 212, and as storing regions of other user programs or data 214, 216 and 218. The executive table stores each condition within the module, even if the module is disengaged from the main body, so that the same contents as those of the system area SA are stored in the executive table KT.

If the password mode is selected and "ABC" ENTER is input through a keyboard, the "ABC" is set as a first type of predetermined password so that any listing changing, or erasing operations of the program cannot be performed without the password. When "ABC" ENTER is input through a keyboard in a condition where the password "ABC" is set, the password is released, thus allowing listing, changing, or erasing operations of the program to be effected. These operations are possible when the first type of predetermined password has been entered. Therefore, so long as the password is unknown, the program cannot be altered. Contents protection by such passwords as described hereinabove is also available under the system.

According to one embodiment of the present invention, the password may not be released again once the PASS "ABC"; ENTER is input through the keyboard. In this arrangement, a second type of predetermined password "'ABC';" is entered and this type of password cannot be changed or erased unless power to the system is interrupted as will be described below.

FIG. 4 is a flow chart showing the steps of processing PASS instructions. At first in step 300, the condition of the password setting flag PASF1 is judged, if the condition is a reset one, the password is written in a password register, PASW1, step 302. The "ABC" is set as the descriptive portion of the predetermined password in the above-described example. Then after the password is stored, it is judged in step 304 whether or not semicolons exist to determine whether a second type of predetermined password is present (the coded portion of the predetermined password). If the semicolon has been specified, the writing prohibition flag WRP1 is set at step 306. Furthermore, a password setting flag PASF1 is set at step 308. If the semicolon has not been set, a first type of predetermined password is present and the flag WRP1 remains set. When the PASS instructions have been carried out with the flag WRP1 being set as indicated in step 312, an error processing results even if the passwords coincide as apparent from FIG. 4, so that the flags WRP1 and PASF1 are not reset. Moreover, as indicated in FIG. 4, if a user password does not correspond to the stored predetermined password, an error processing will then result in step 310. Accordingly, the contents of the programs or the data may not be changed. When the erasing operation is required by any means in step 314, batteries are drawn out for physical erasion.

FIG. 5 shows the steps for processing data erasing instructions. There are fixed variables, simple variables, and array variables normally stored as data in the computer, the fixed variables among them are written and read out into a fixed address of the RAM within the main body. Accordingly, the fixed variables are lost in step 302 when the module is converted and are erased without fail by the CLEAR instructions in step 304. If the writing prohibition flag WRP1 is kept set when the CLEAR instructions have been manually carried out, a processing error results as indicated in step 306. Namely in manual operation, the variables except for the fixed variables are protected without being erased. When the CLEAR instructions, which are in the program, have been carried out even if WRP1 = 1, the array variable or the simple variables are cleared as shown in step 308. Accordingly, although the data may be optionally erased in the case of a program execution, the program itself may not be changed, with the result that the data may be protected.

FIG. 6 is a flow chart showing the processing of program execution start instructions. After the variables have been cleared in step 504, unless the flag WRP1 is set in step 502, the program is carried out in step 506. The program is carried out without clearing the variables if WRP1 = 1.

FIG. 7 is a flow chart showing automatic clear processing. Automatic clear processing is performed in any one of the cases where the power supply switch has been turned on from its off position, where the on brake key (4-1 of FIG. 1) has been depressed, in its automatic power off, and where a reset switch disposed on the reverse face of the main body has been depressed as indicated in step 604. However, the variables are not cleared if WRP1 = 1 as indicated in step 602 so that the other condition such as display contents or mode is initialized.

It is to be noted that the contents of the system area are duplicated on the executive table by operation of the ENTER key (4-2 of FIG. 1) or by turning off the power supply switch 3. Accordingly, when the module is disengaged, the contents of the executive table become such that the contents of the system area are kept as they are. Also, the contents of the executive table are moved into the system area by the automatic clear processing function performed when the power supply switch has been turned on. Thus, the contents are protected when a module wherein writing prohibition has been performed is engaged.

As is clear from the foregoing description, according to the arrangement of the present invention, the information protective device comprises a prohibition condition storing portion, which stores the writing prohibition condition to a storage unit for programs, data or the like, and a prohibition condition setting means, which carries out the writing prohibition instructions to be stored in the storing portion to set the writing prohibition condition, so that the storage unit may be handled like so-called read only memory (ROM), whereby the storing contents may be protected more positively.

Although the present invention has been fully described by way of example with reference to the accompanying drawings, it is to be noted there that various changes and modifications will be apparent to those skilled in the art. Therefore, unless otherwise such changes and modifications depart from the scope of the present invention, they should be construed as being included therein.

What is claimed is:

1. A security system for a data entry and storage device comprising:
   keyboard means for enabling the device to permit at least entry or retrieval of data to or from the device, said keyboard means being responsive to a predetermined password, said predetermined password being of a first or a second type, said first type of predetermined password containing a descriptive portion, said second type of predetermined password containing both a descriptive portion and a coded portion, a user password being entered on said keyboard means before enabling of said device;

means for entering at least the predetermined password in the device before said user password is entered;

means for storing the entered predetermined password in the device before said user password is entered;

means for identifying said user password entered on the keyboard means and for determining whether said user password corresponds to said descriptive portion of said predetermined password and for determining whether the entered predetermined password is a first or second type;

means for enabling said device to enter and retrieve protected data through said keyboard means after said means for entering enters said predetermined password, after said keyboard means enters a user password, and after said means for identifying determines correspondence between said user password and the descriptive portion of said predetermined password;

said means for entering further entering a new predetermined password if said means for enabling has enabled the device and if said means for identifying determines the previously entered predetermined password is a first type; and means for precluding said means for entering from entering the new predetermined password after an initial predetermined password is entered provided said initial predetermined password is said second type of predetermined password, however, said means for precluding permitting entry of the new predetermined password by said means for entering provided said initial predetermined password is said first type of predetermined password.

2. The security system as recited in claim 1, wherein said security system further includes means for supplying power to said system, said means for precluding failing to preclude entry of a new password regardless of whether said initial predetermined password is said first or second type when the supply of power to said system by said means for supplying is interrupted.

3. The security system as recited in claim 1, wherein said coded portion of said second type of password is a semicolon and said means for precluding prohibits entry of a new password after an initial password with a semicolon coded portion has been entered unless a supply of power to said system is interrupted.

4. A method for protecting data in a data entry and storage device comprising the steps of:

entering a predetermined password in the device, said predetermined password being a first or a second type, said first type of predetermined password containing a descriptive portion and said second type of predetermined password containing both a descriptive portion and a coded portion;

entering and storing data in said device, said data being associated with the predetermined password;

inputting a user password in said device;

determining whether said user password corresponds to the descriptive portion of the predetermined password;

accessing said data if said user password corresponds to the descriptive portion of the predetermined password;

entering a new predetermined password after the accessing if the predetermined password which was previously entered is a first type, said new predetermined password being exchanged for the previously entered predetermined password upon entering of the new predetermined password; and precluding entry of a new predetermined password after the accessing if the previously entered predetermined password is a second type.

5. The method for protecting data as recited in claim 4, further comprising the step of interrupting a supply of power to the device whereafter entry of a new predetermined password is permitted regardless of whether the previously entered predetermined password is a first or second type, the step of precluding therefor failing to preclude entry after the interrupting until a new predetermined password is entered.

6. A security system for a data entry and storage device comprising:

keyboard means for enabling the device to permit at least entry of retrieval of data to or from the device, said keyboard means being responsive to a predetermined password, said predetermined password being of a first or a second type, said first type of predetermined password containing a descriptive portion, said second type of predetermined password containing both a descriptive portion and a coded portion, a user password being entered on said keyboard means before enabling said device;

means for entering at least the predetermined password into the device before said user password is entered;

means for storing the entered predetermined password in the device;

means for identifying said user password entered on the keyboard means and for determining whether said user password corresponds to said descriptive portion of said predetermined password and for determining whether the entered password is a first or second type;

means for enabling said device to enter and retrieve protected data through said keyboard means after said means for entering enters said predetermined password, after said keyboard means enters a user password, and after said means for identifying determines correspondence between said user password and the descriptive portion of said predetermined password;

said means for entering allowing a user to change or erase the retrieved protected data through the keyboard means if said means for enabling has enabled the device and if said means for identifying determines the previously entered predetermined password is a first type;

means for precluding said means for entering from allowing the user to change or erase the retrieved protected data after an initial predetermined password is entered provided said initial predetermined password is said second type of predetermined password, however, said means for precluding allowing the user to change or erase the retrieved protected data provided said initial predetermined password is said first type of predetermined password; and means for supplying power to the system, said means for precluding allowing changing or erasing of the retrieved protected data regardless of whether said initial predetermined password is said first or second type when the supply of power to said system by said means for supplying is interrupted and then restored.

7. A method for protecting data in a data entry and storage device comprising the steps of:

entering a predetermined password in the device, said predetermined password being a first or a second type, said first type of predetermined password containing a descriptive portion and said second type of predetermined password containing both a descriptive portion and a coded portion;

entering and storing data in said device, said data being associated with the predetermined password;

inputting a user password in said device;

determining whether said user password corresponds to the descriptive portion of the predetermined password;

accessing said data if said user password corresponds to the descriptive portion of the predetermined password;

changing or erasing the predetermined password after the accessing if the predetermined password which was previously entered is a first type;

precluding changing or erasing of the predetermined password after the accessing if the previously entered predetermined password is a second type; and interrupting a supply of power to the device whereafter changing or erasing of the predetermined password is permitted regardless of whether the previously entered predetermined password is a first or second type, the step of precluding therefore failing to preclude changing or erasing after the interrupting until a new predetermined password is entered.

* * * * *